US009003792B2

(12) United States Patent
Gonzalez Delgado et al.

(10) Patent No.: US 9,003,792 B2
(45) Date of Patent: Apr. 14, 2015

(54) EXHAUST AFTERTREATMENT AND EXHAUST GAS RECIRCULATION SYSTEMS

(75) Inventors: Manuel Angel Gonzalez Delgado, Rochester Hills, MI (US); Julian C. Tan, Vernon Hills, IL (US); Joshua Clifford Bedford, Farmington Hills, MI (US); Yong Miao, Ann Arbor, MI (US); Naser I. Hineiti, Novi, MI (US); Steven M. Yocum, Addison Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 477 days.

(21) Appl. No.: 13/440,159

(22) Filed: Apr. 5, 2012

(65) Prior Publication Data
US 2013/0263593 A1 Oct. 10, 2013

(51) Int. Cl.
| F02B 33/44 | (2006.01) |
| F01N 3/00 | (2006.01) |
| F01N 5/04 | (2006.01) |
| F02M 25/07 | (2006.01) |
| F01N 3/035 | (2006.01) |
| F01N 3/10 | (2006.01) |

(52) U.S. Cl.
CPC .......... F02M 25/0709 (2013.01); F01N 3/00 (2013.01); F01N 3/035 (2013.01); F01N 3/10 (2013.01); *Y02T 10/121* (2013.01); *Y02T 10/144* (2013.01); *Y02T 10/146* (2013.01)

(58) Field of Classification Search
CPC ........... F01N 3/00; F01N 3/035; F01N 3/10; F02M 25/0709; Y02T 10/121; Y02T 10/144; Y02T 10/146
USPC ............... 60/605.2, 295, 278, 280, 288, 299; 123/568.11, 568.12; 423/210, 213.7; 422/170, 178
See application file for complete search history.

(56) References Cited

U.S. PATENT DOCUMENTS

| 6,470,682 B2 * | 10/2002 | Gray, Jr. ............... 60/605.2 |
| 6,474,060 B2 * | 11/2002 | Khair ................... 60/278 |
| 6,568,179 B2 * | 5/2003 | Deeba .................. 60/288 |
| 7,178,492 B2 * | 2/2007 | Coleman et al. ......... 123/90.15 |

(Continued)

FOREIGN PATENT DOCUMENTS

| JP | 2004239109 A | * | 8/2004 | ............. F01N 3/20 |
| JP | 2004346794 A | * | 12/2004 | ............. F01N 3/08 |
| WO | WO 2011090190 A1 | * | 7/2011 | ............. F01N 3/02 |

OTHER PUBLICATIONS

Chinese Office Action for CN Application No. 201310116874.9 dated Jan. 27, 2014, pp. 1-6.

*Primary Examiner* — Thai Ba Trieu
(74) *Attorney, Agent, or Firm* — Cantor Colburn LLP

(57) ABSTRACT

In an exemplary embodiment, an internal combustion engine includes an oxidation catalyst configured to receive an exhaust gas flow from the internal combustion engine, a urea injector positioned downstream of the oxidation catalyst to inject a urea flow into the exhaust gas flow and a mixer positioned downstream of the urea injector to mix the exhaust gas flow and the urea flow to form a mixed exhaust gas and urea flow. The engine also includes a particulate filter and catalytic reduction assembly positioned downstream of the mixer to receive the mixed exhaust and urea flow from the mixer to form a treated exhaust gas flow and an exhaust gas recirculation system coupled to the particulate filter to receive a portion of the treated exhaust gas flow and recirculate the portion of the exhaust gas flow to be mixed with a fresh air flow for the internal combustion engine.

19 Claims, 2 Drawing Sheets

(56) References Cited

U.S. PATENT DOCUMENTS

| | | | |
|---|---|---|---|
| 7,241,329 B2* | 7/2007 | Weber | 422/178 |
| 7,264,785 B2* | 9/2007 | Blakeman et al. | 423/213.2 |
| 7,591,131 B2* | 9/2009 | Easley et al. | 60/278 |
| 7,727,498 B2* | 6/2010 | Hodgson et al. | 423/210 |
| 7,805,926 B2* | 10/2010 | Abi-Akar et al. | 60/278 |
| 8,105,542 B2* | 1/2012 | Sato et al. | 422/170 |
| 8,151,558 B2* | 4/2012 | Robel et al. | 60/295 |
| 8,409,515 B2* | 4/2013 | Ren et al. | 60/299 |
| 8,443,602 B2 | 5/2013 | Bennet et al. | |
| 8,667,780 B2 | 3/2014 | Hepburn et al. | |
| 2005/0028518 A1* | 2/2005 | Li et al. | 60/300 |
| 2006/0080953 A1 | 4/2006 | Maus et al. | |
| 2007/0068141 A1 | 3/2007 | Opris et al. | |
| 2008/0155972 A1* | 7/2008 | Driscoll et al. | 60/299 |
| 2009/0031705 A1* | 2/2009 | Yoshida et al. | 60/278 |
| 2011/0011068 A1* | 1/2011 | Ren et al. | 60/297 |
| 2011/0239630 A1* | 10/2011 | Bennet et al. | 60/280 |
| 2011/0314797 A1* | 12/2011 | Moravec et al. | 60/278 |
| 2012/0240557 A1* | 9/2012 | Kawaguchi et al. | 60/278 |
| 2012/0272938 A1* | 11/2012 | Blumendeller et al. | 123/568.11 |
| 2012/0315204 A1* | 12/2012 | Osumi | 423/213.7 |
| 2013/0061579 A1* | 3/2013 | Kotrba et al. | 60/295 |
| 2013/0186064 A1* | 7/2013 | Mehta | 60/274 |
| 2013/0195628 A1* | 8/2013 | Keefover | 415/146 |
| 2013/0239547 A1* | 9/2013 | Gingrich et al. | 60/299 |
| 2013/0291524 A1* | 11/2013 | Shin | 60/297 |
| 2013/0298551 A1* | 11/2013 | Shin | 60/605.1 |

* cited by examiner

EXHAUST AFTERTREATMENT AND EXHAUST GAS RECIRCULATION SYSTEMS

FIELD OF THE INVENTION

The subject invention relates to internal combustion engines, and more particularly, to exhaust aftertreatment systems and exhaust gas recirculation systems of internal combustion engines.

BACKGROUND

An engine control module of an internal combustion engine controls the mixture of fuel and air supplied to combustion chambers of the engine. After the air/fuel mixture is ignited, combustion takes place and later the combustion gases exit the combustion chambers through exhaust valves. The combustion gases are directed by an exhaust manifold to a catalytic converter or other exhaust aftertreatment systems.

Manufacturers of internal combustion engines, particularly diesel engines, are presented with the challenging task of complying with current and future emission standards for the release of nitrogen oxides, particularly nitrogen monoxide, as well as unburned and partially oxidized hydrocarbons, carbon monoxide, particulate matter, and other pollutants. In order to reduce the exhaust emissions of an internal combustion engine, an exhaust gas aftertreatment system is used to reduce regulated emissions within the exhaust gas flowing from the engine.

Exhaust gas aftertreatment systems typically include one or more aftertreatment devices, such as, particulate filters, catalytic converters, mixing elements and urea/fuel injectors. Variations in exhaust gas flow, such as lack of uniform flow, can adversely affect the performance of the aftertreatment system, thus causing unwanted exhaust constituents to be released from the system. As emissions standards become increasingly stringent, improving the uniformity and distribution of the exhaust gas flow as it enters and flows through the aftertreatment system is desirable in meeting those standards. Exhaust gas flow uniformity may be enhanced by lengthening the flow path of the exhaust gas, however, packaging restrictions in modern vehicles may prevent designs with long flow paths. Further, some aftertreatment devices perform more efficiently when heated to a certain temperature. Therefore, a long exhaust gas flow path can lead to inefficient exhaust treatment, due to the larger thermal mass and resulting thermal losses as the exhaust gas flows along the path. Accordingly, several factors affect the design of exhaust aftertreatment systems.

Exhaust emissions may also be reduced by utilizing exhaust gas recirculation (EGR) techniques. Efficient use of EGR generally supports the objectives of realizing high power output from engines while also achieving higher fuel efficiency and economy and achieving increasingly stringent engine emission requirements. However, as engines become more complex, the packaging of various components can make the design of EGR systems in combination with exhaust aftertreatment systems more challenging.

Accordingly, achieving desired emissions reductions while improving efficiency may be challenging in view of modern vehicle packaging requirements and limitations.

SUMMARY OF THE INVENTION

In one exemplary embodiment of the invention, an internal combustion engine includes a turbocharger configured to receive an exhaust gas flow from the internal combustion engine, an oxidation catalyst close coupled to the turbocharger to receive the exhaust gas flow from the turbocharger and a first conduit coupled to the oxidation catalyst to receive the exhaust gas flow from the oxidation catalyst and a emission fluid flow from an injector. The internal combustion engine also includes a mixer coupled to the first conduit to receive the exhaust gas flow and the emission fluid flow from the first conduit and to form a mixed exhaust gas and emission fluid flow, a particulate filter and catalytic reduction assembly close coupled to the mixer to receive the mixed exhaust gas and emission fluid flow from the mixer to form a treated exhaust gas flow and an exhaust gas recirculation system coupled to the particulate filter and catalytic reduction assembly to receive a portion of the treated exhaust gas flow and recirculate the portion of the exhaust gas flow to be mixed with a fresh air flow for the internal combustion engine, wherein the oxidation catalyst, first conduit, mixer, particulate filter and catalytic reduction assembly and exhaust gas recirculation system are each located in an engine compartment.

In another exemplary embodiment of the invention, an exhaust aftertreatment system for an internal combustion engine includes an oxidation catalyst configured to receive an exhaust gas flow from the internal combustion engine, a urea injector positioned downstream of the oxidation catalyst to inject a urea flow into the exhaust gas flow and a mixer positioned downstream of the urea injector to mix the exhaust gas flow and the urea flow to form a mixed exhaust gas and urea flow. The engine also includes a particulate filter and catalytic reduction assembly positioned downstream of the mixer to receive the mixed exhaust and urea flow from the mixer to form a treated exhaust gas flow and an exhaust gas recirculation system coupled to the particulate filter to receive a portion of the treated exhaust gas flow and direct it to be mixed with a fresh air flow for the internal combustion engine, wherein the oxidation catalyst, urea injector, mixer, particulate filter and exhaust gas recirculation system are each located in an engine compartment.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
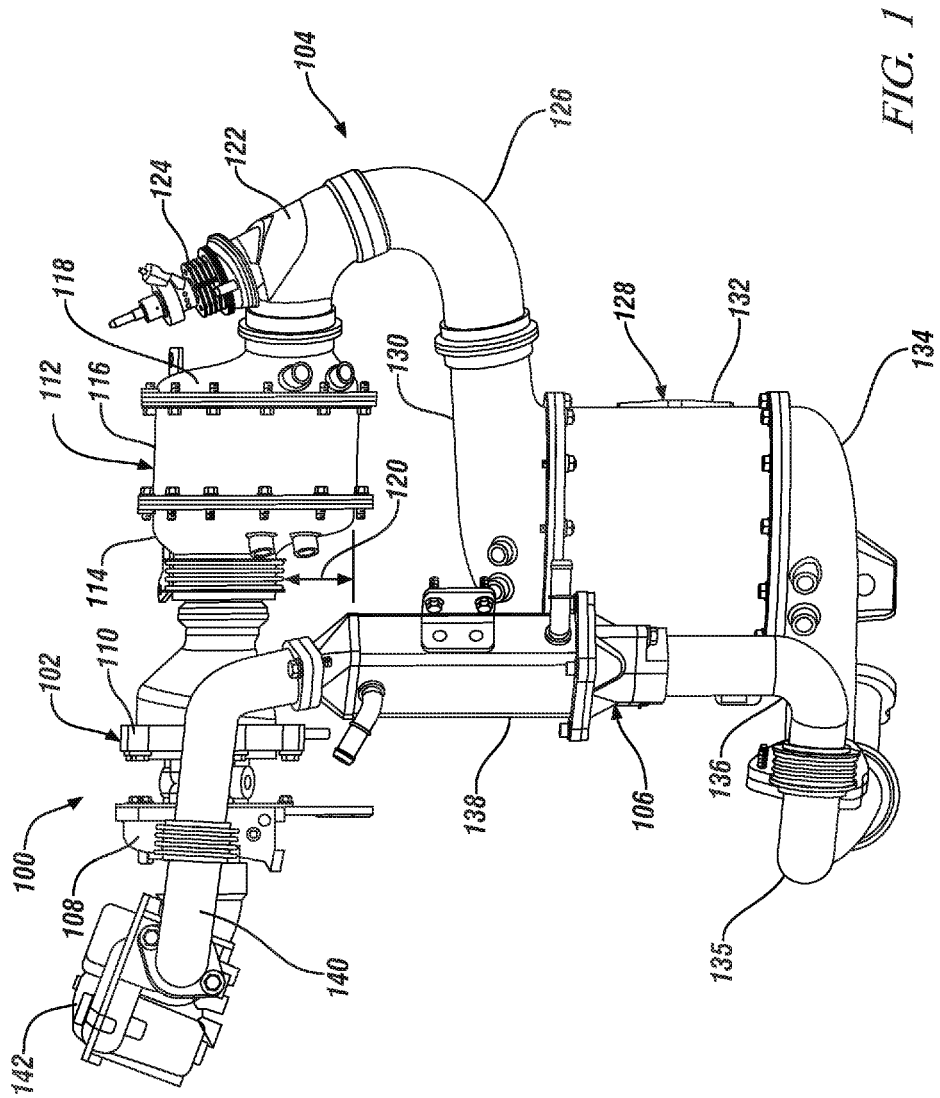
FIG. 1 is a front view of portions of an exemplary internal combustion engine including an exhaust aftertreatment system, a turbocharger and an exhaust gas recirculation system.

The following description is merely exemplary in nature and is not intended to limit the present disclosure, its application or uses. It should be understood that throughout the drawings, corresponding reference numerals indicate like or corresponding parts and features.

Figure 2:
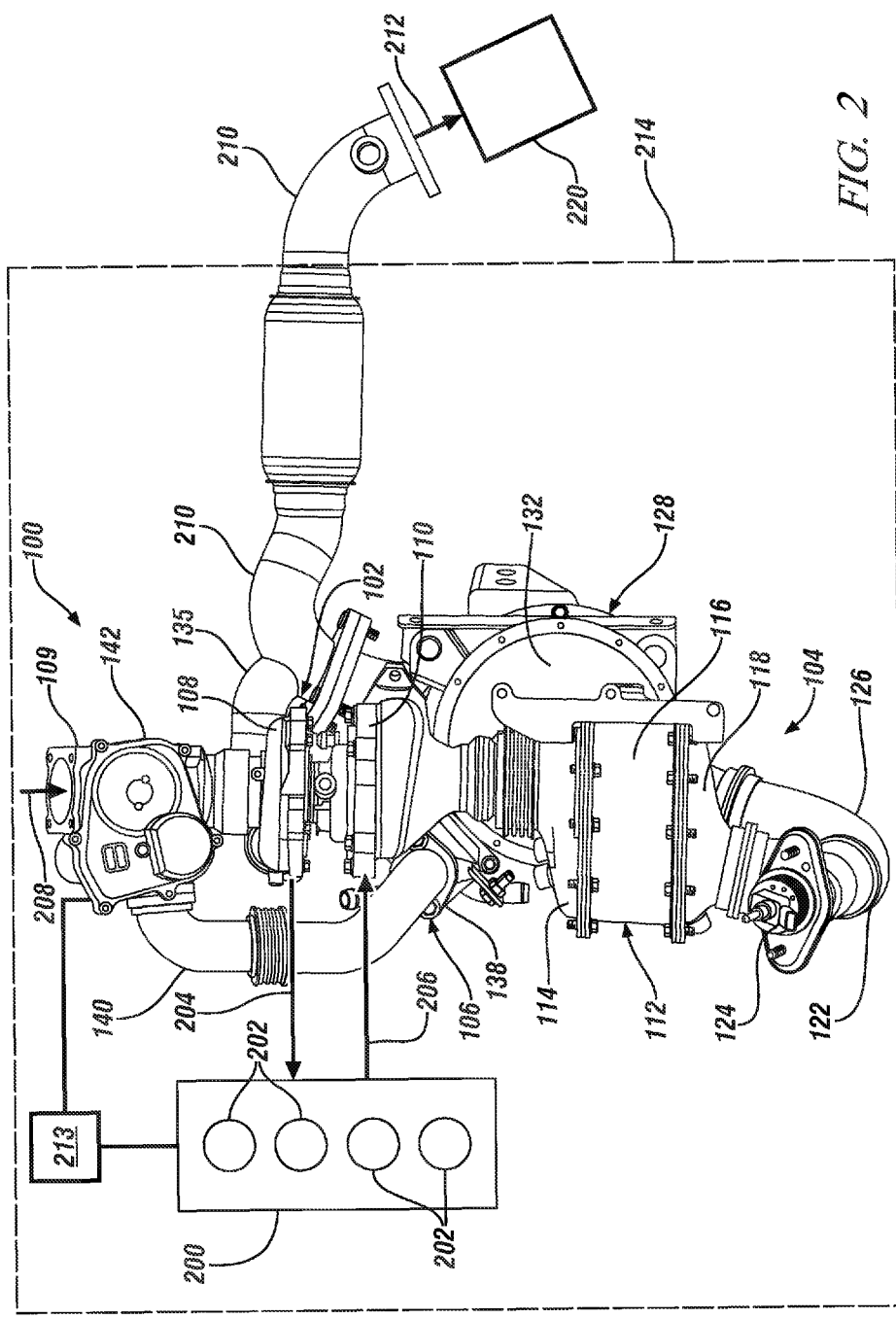
FIG. 2 is a top view of portions of the internal combustion engine of FIG. 1.

Referring to FIGS. 1 and 2, an exemplary embodiment of portions of an internal combustion engine 100 is illustrated, in this case an in-line four cylinder engine, including a turbocharger 102, an exhaust aftertreatment system 104 and an exhaust gas recirculation (EGR) system 106. The internal combustion engine 100 includes an engine block 200 with a plurality of cylinders 202 into which a combination of combustion air and fuel are introduced. The combustion air/fuel mixture is combusted resulting in reciprocation of pistons (not shown) therein. The reciprocation of the pistons rotates a crankshaft (not shown) to deliver motive power to a vehicle powertrain (not shown) or to a generator or other stationary recipient of such power (not shown) in the case of a stationary application of the internal combustion engine 100. The internal combustion engine 100 includes an intake manifold (not shown) in fluid communication with the cylinders 202 that receives a compressed air intake charge 204 from a compressor 108 in the turbocharger 102 and delivers the charge to the plurality of cylinders 202. The turbocharger 102 also includes a turbine 110 rotatably driven by an exhaust gas flow 206 from the cylinders 202. The exhaust aftertreatment system 104 includes an oxidation catalyst 112 in fluid communication with the turbocharger 102 that receives the exhaust gas flow 206 from the cylinders 202 via the turbine 110. The intake flow 204 comprises a fresh air flow 208 which enters the compressor 108 through intake 109 and an optional recirculated exhaust gas flow described further below. The compressor 108 compresses the intake flow 204 via a compressor wheel (not shown) rotatably coupled via shaft (not shown) to a turbine wheel (not shown) in the turbine 110.

The oxidation catalyst 112 is coupled to an outlet of the turbocharger 102 via an inlet cone 114 and is configured to treat various regulated constituents of the exhaust gas flow 206. The exemplary oxidation catalyst 112 includes the inlet cone 114 coupled to the turbine 110 outlet, wherein the inlet cone includes directional flaps or deflectors to control flow of and distribute the exhaust gas flow across a receiving portion of the oxidation catalyst 112. In an embodiment, the directional flaps are part of a cross-sectional grate that improve exhaust gas distribution as it flows into the oxidation catalyst, which improves oxidation reduction by the catalyst. The oxidation catalyst 112 includes a substrate (not shown) located within a canister 116, wherein a catalyst is disposed on the substrate to oxidize hydrocarbons ("HC") and carbon monoxide ("CO"). The oxidation catalyst 112 also includes an outlet cone 118 that directs the exhaust gas flow from the device. As depicted, the oxidation catalyst 112 is offset, as shown by an offset distance 120, with respect to flow through the inlet cone 114 from the turbocharger 102, thereby enabling a compact arrangement of the components within an engine compartment 214. In addition to being arranged in a compact fashion relative to the turbocharger 102, the oxidation catalyst 112 is close coupled to the engine block 200. As discussed herein, close coupled components are located in relatively close proximity to an exhaust port of the engine block 200 to reduce a length of at least a portion of an exhaust gas flow path. Further, close coupled components are placed substantially adjacent or proximate one another to cause a reduced exhaust flow path between components. The depicted aftertreatment configuration reduces exhaust gas heat losses and reduces the time required for effective catalyst conversion efficiency light-off after engine start up. In addition, the arrangement enables an increase in the overall catalyst conversion efficiency due to the reduced exhaust gas heat losses. In embodiments, close coupled components are located in the engine compartment 214 and are not located under the floor of the vehicle. In other configurations, one or more exhaust aftertreatment devices or components are located under the floor of the vehicle.

The depicted compact arrangement also includes a particulate filter and catalytic reduction assembly 128, which has multiple aftertreatment functions at the same exhaust flow location. The exhaust aftertreatment system 104 further includes a conduit 122, a urea injector 124 and a mixer 126. The conduit 122 receives the exhaust gas flow from the oxidation catalyst 112 and receives a flow of a suitable emission fluid, such as urea (for NOx reduction), from injector 124. The exhaust gas and emission fluid is mixed in mixer 126 to improve emissions reduction within the exhaust aftertreatment system 104. The mixer 126 receives and enhances mixing of the flow of urea fluid and exhaust gas via suitable devices or structures, such as swirlers, fins, blades and any other suitable device to break up, mix and distribute urea fluid droplets within the exhaust gas flow. The mixed flow of urea fluid and exhaust gas then flows into a particulate filter and catalytic reduction assembly 128, which includes an inlet cone 130, a canister 132 and an outlet cone 134. The inlet cone 130 enables a distribution of the urea and exhaust gas flow across one or more treatment devices within the canister 132. In an embodiment, the canister 132 contains a diesel particulate filter that has a catalyst coating for NOx reduction purposes. Other embodiments of the canister 132 may include one or more suitable exhaust aftertreatment devices, such as a single particulate filter or other substrate and catalyst combination. In an embodiment, the particulate filter and catalytic reduction assembly 128 are a single assembly. As depicted, the portion of a treated exhaust gas flow 206 is directed from the outlet cone 134 of the particulate filter and catalytic reduction assembly 128 through a conduit 135 that is part of the EGR system 106. The treated exhaust gas flow may be a flow of exhaust gas with reduced pollutants for use by the EGR system 106 and, optionally, for further treatment. As shown in FIG. 2, a conduit 210 directs the treated exhaust gas flow 212 to an under floor portion of the exhaust system. In an embodiment, an underfloor catalytic reduction assembly 220 is positioned downstream of the particulate filter and catalytic reduction assembly 128 and is configured to further treat the exhaust gas flow 212. Embodiments of the exhaust aftertreatment system 104 may include one or more structures, such as directional flaps, positioned along the flow path to control flow and distribute exhaust flow into devices, such as across a face of a filter or catalyst and substrate.

In an embodiment, the EGR system 106 includes a filter 136, a cooler 138, a conduit 140 and a valve 142. A recirculated exhaust gas flow is derived from a portion of the treated exhaust, wherein the filter 136 receives the recirculated exhaust gas flow and removes selected pollutants and/or particles from the gas. The cooler 138 is a suitable heat exchanger device that uses a fluid, such as a cooling fluid or water, to remove heat from the recirculated exhaust gas flow, before mixing with the fresh air flow 208, to improve engine combustion. As depicted, the recirculated exhaust is supplied by a portion of the treated exhaust flowing from the particulate filter and catalytic reduction assembly 128. Accordingly, the recirculated exhaust gas flow has a substantially reduced quantity of exhaust constituents and/or particles before being diverted to the EGR system 106. Therefore, configurations of the internal combustion engine 100 may operate with a controlled mixture of the fresh air flow 208 and recirculated exhaust gas flow due to the substantially reduced pollutants in the supplied recirculation exhaust gas flow.

In embodiments, the configuration of the exhaust aftertreatment system 104 causes heat to transfer to devices, such as the oxidation catalyst 112, mixer 126, and particulate filter and catalytic reduction assembly 128. The transfer of heat from the exhaust gas also cools the recirculated exhaust gas flow, thereby reducing the size of the cooler 138. The valve 142 is a suitable valve to control the flow of recirculated exhaust gas and the fresh air flow 208 into the turbocharger 102. In one embodiment, the valve 142 is a three-way valve to control fluid flow. As depicted, the valve 142 is in signal communication with a controller 213. The controller 213 and the valve 142 adjusts the volumetric quantity of recirculated exhaust gas to the turbocharger 102, and, subsequently, the cylinders 202, based on the particular engine operating conditions at any given time. The controller 213 collects information regarding the operation of the internal combustion engine 100 from sensors, such as temperature (intake system, exhaust system, engine coolant, ambient, etc.), pressure, exhaust system conditions, driver demand and, as a result, may adjust the flow of recirculated exhaust gas through the valve 142 to be mixed with the fresh air 208 to form the intake flow 204. As used herein, the term controller refers to an application specific integrated circuit (ASIC), an electronic circuit, a processor (shared, dedicated or group) and memory that executes one or more software of firmware programs, a combinational logic circuit, and/or other suitable components that provide the described functionality. As a result, the intake flow 204 may comprise a continuously variable combination of fresh air 208 and recirculated exhaust gas, depending on the commanded quantity of recirculated exhaust gas by the controller 213.

The depicted arrangement of the internal combustion engine 100 includes the engine block 200, the turbocharger 102, the exhaust aftertreatment system 104 and the EGR system 106 each located within the engine compartment 214. By closely coupling the exhaust aftertreatment system 104 and EGR system 106 components to the internal combustion engine 100, the improved packaging provides improved efficiency and emissions reduction. The arrangement and close coupling of the turbocharger 102, the oxidation catalyst 112, the urea injector 124, the conduit 122, the mixer 126 and the particulate filter and catalytic reduction assembly 128 provides reduced thermal loss from exhaust gas flow. The thermal loss from the exhaust gas flow is lower compared to a system with exhaust aftertreatment components positioned under the vehicle floor, wherein a longer under floor exhaust path causes thermal loss prior to treatment by aftertreatment devices. Accordingly, reduced thermal loss from the exhaust gas flow improves heating of aftertreatment devices, wherein the aftertreatment devices remove targeted constituents more efficiently when heated to higher temperatures. Specifically, embodiments of the aftertreatment devices such as the oxidation catalyst 112 and catalytic reduction assembly 128 operate more efficiently when heated to a threshold operating temperature quickly. Therefore, the close coupled arrangement of the exhaust aftertreatment system 104 reduces thermal loss by shortening the exhaust gas flow path, thereby improving emissions reduction efficiency.

In addition, the EGR system 106 is arranged to receive recirculated exhaust flow from the exhaust aftertreatment system 104 within the engine compartment 214. The exhaust aftertreatment system 104 supplies the treated exhaust gas flow at lower pressure as compared to a pressure of the exhaust gas flow 206 proximate the engine block 200. The relatively low pressure exhaust gas flow used as recirculated exhaust also features reduced regulated constituents and/or particles, thus improving combustion performance when the recirculated exhaust gas is directed into the cylinders 202 for combustion. The configuration of the exemplary internal combustion engine 100 improves packaging while causing reduced emissions and enhanced performance.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An internal combustion engine comprising:
a turbocharger configured to receive an exhaust gas flow from the internal combustion engine;
an oxidation catalyst close coupled to the turbocharger to receive the exhaust gas flow from the turbocharger;
a conduit coupled to the oxidation catalyst to receive the exhaust gas flow from the oxidation catalyst and an emission fluid flow from an injector;
a mixer coupled to the conduit to receive the exhaust gas flow and the emission fluid flow from the conduit and to form a mixed exhaust gas and emission fluid flow;
a particulate filter and catalytic reduction assembly close coupled to the mixer to receive the mixed exhaust gas and emission fluid flow from the mixer to form a treated exhaust gas flow; and
an exhaust gas recirculation system coupled to the particulate filter and catalytic reduction assembly to receive a portion of the treated exhaust gas flow and recirculate the portion of the exhaust gas flow to be mixed with a fresh air flow for the internal combustion engine, wherein the oxidation catalyst, conduit, mixer, particulate filter and catalytic reduction assembly and exhaust gas recirculation system are each located in an engine compartment.

2. The internal combustion engine of claim 1, wherein the exhaust gas recirculation system comprises a cooler to cool the recirculation exhaust gas flow prior to mixing with the fresh air flow.

3. The internal combustion engine of claim 2, wherein the recirculation exhaust gas flow is substantially lower pressure compared to the exhaust gas exiting from the internal combustion engine.

4. The internal combustion engine of claim 2, wherein the exhaust gas recirculation system comprises a filter to filter the recirculation exhaust gas flow prior to mixing with the fresh air flow.

5. The internal combustion engine of claim 1, wherein the turbocharger receives the fresh air flow mixed with the recirculation exhaust gas flow in a compressor and receives the exhaust gas flow from the internal combustion engine in a turbine.

6. The internal combustion engine of claim 1, comprising an inlet cone coupled to the mixer and the particulate filter and catalytic reduction assembly to distribute the mixed exhaust and emission fluid flow from the mixer across a receiving portion of the particulate filter and catalytic reduction assembly.

7. The internal combustion engine of claim 1, wherein the oxidation catalyst, conduit, mixer, particulate filter and catalytic reduction assembly and exhaust gas recirculation system are not located beneath a floor of a vehicle housing the internal combustion engine.

8. The internal combustion engine of claim 1, wherein the emission fluid flow comprises a urea fluid flow.

9. An exhaust aftertreatment system for an internal combustion engine comprising:
an oxidation catalyst configured to receive an exhaust gas flow from the internal combustion engine;

a urea injector positioned downstream of the oxidation catalyst to inject a urea flow into the exhaust gas flow;

a mixer positioned downstream of the urea injector to mix the exhaust gas flow and the urea flow to form a mixed exhaust gas and urea flow;

a particulate filter and catalytic reduction assembly positioned downstream of the mixer to receive the mixed exhaust and urea flow from the mixer to form a treated exhaust gas flow;

an exhaust gas recirculation system coupled to the particulate filter to receive a portion of the treated exhaust gas flow and direct it to be mixed with a fresh air flow for the internal combustion engine, wherein the oxidation catalyst, urea injector, mixer, particulate filter and exhaust gas recirculation system are each located in an engine compartment; and an underfloor catalytic reduction assembly positioned downstream of the particulate filter and catalytic reduction assembly.

10. The exhaust aftertreatment system for an internal combustion engine of claim 9, comprising a turbocharger to receive the fresh air flow mixed with the recirculation exhaust gas flow in a compressor and to receive the exhaust gas flow from the internal combustion engine in a turbine, the oxidation catalyst being close coupled to the turbocharger.

11. The exhaust aftertreatment system for an internal combustion engine of claim 9, wherein the exhaust gas recirculation system comprises a cooler to cool the recirculation exhaust gas flow prior to mixing with the fresh air flow.

12. The exhaust aftertreatment system for an internal combustion engine of claim 9, wherein the recirculation exhaust gas flow is substantially lower pressure than the exhaust gas flow exiting the internal combustion engine.

13. The exhaust aftertreatment system for an internal combustion engine of claim 9, wherein the exhaust gas recirculation system comprises a filter to filter the recirculation exhaust gas flow prior to mixing with the fresh air flow.

14. The exhaust aftertreatment system for an internal combustion engine of claim 9, wherein the oxidation catalyst, conduit, mixer, particulate filter and exhaust gas recirculation system are close coupled to the internal combustion engine.

15. An internal combustion engine exhaust aftertreatment system comprising:

an oxidation catalyst configured to receive an exhaust gas flow from the internal combustion engine;

a conduit coupled to the oxidation catalyst to receive the exhaust gas flow from the oxidation catalyst and a urea flow from an injector;

a mixer coupled to the conduit to receive the exhaust gas flow and the urea flow from the conduit and to form a mixed exhaust gas and urea flow;

a particulate filter and catalytic reduction assembly coupled to the mixer to receive the mixed exhaust and urea flow from the mixer to form a treated exhaust gas flow; and an exhaust gas recirculation system to receive a portion of the treated exhaust gas flow and direct it to be mixed with a fresh air flow for the internal combustion engine, wherein the oxidation catalyst, urea injector, mixer, particulate filter and catalytic reduction assembly and exhaust gas recirculation system are closely coupled to the internal combustion engine.

16. The internal combustion engine exhaust aftertreatment system of claim 15, wherein the exhaust gas recirculation system comprises a cooler and a filter to cool and filter, respectively, the recirculation exhaust gas flow.

17. The internal combustion engine exhaust aftertreatment system of claim 15, wherein the oxidation catalyst, urea injector, mixer, particulate filter and catalytic reduction assembly and exhaust gas recirculation system are each located in the engine compartment.

18. The internal combustion engine exhaust aftertreatment system of claim 15, wherein the recirculation exhaust gas flow is substantially lower pressure compared to the exhaust gas flow exiting the internal combustion engine.

19. The internal combustion engine exhaust aftertreatment system of claim 15, comprising a turbocharger to receive the fresh air flow and recirculated exhaust gas in a compressor and to receive the exhaust gas flow from the internal combustion engine in a turbine.

* * * * *